United States Patent
Umemoto et al.

(10) Patent No.: US 6,971,469 B2
(45) Date of Patent: Dec. 6, 2005

(54) SELF-PROPELLED WORKING VEHICLE

(75) Inventors: Hideya Umemoto, Sakai (JP); Takeshi Komorida, Sakai (JP); Shoso Ishimori, Sakai (JP); Takashi Fujii, Sakai (JP); Koji Fujiwara, Sakai (JP); Hiroyuki Tada, Sakai (JP)

(73) Assignee: Kubota Corporation, Osaka (JP)

( * ) Notice: Subject to any disclaimer, the term of this patent is extended or adjusted under 35 U.S.C. 154(b) by 124 days.

(21) Appl. No.: 10/377,589

(22) Filed: Feb. 28, 2003

(65) Prior Publication Data

US 2004/0060745 A1   Apr. 1, 2004

(30) Foreign Application Priority Data

Sep. 26, 2002 (JP) .............................. 2002-281435

(51) Int. Cl.⁷ .............................................. B60K 7/00
(52) U.S. Cl. ..................... 180/305; 180/6.48; 188/18 A
(58) Field of Search ................................ 180/305, 307, 180/308, 6.48, 6.2, 6.3, 6.32, 291, 292; 188/17, 188/18 R, 18 A

(56) References Cited

U.S. PATENT DOCUMENTS

| | | | |
|---|---|---|---|
| 3,612,199 A * | 10/1971 | Vissers ....................... 180/6.32 |
| 4,494,621 A | 1/1985 | Nagata |
| 4,577,714 A * | 3/1986 | Tokunaga .................... 180/308 |
| 4,809,796 A | 3/1989 | Yamaoka et al. |
| 5,117,936 A * | 6/1992 | Nakamura et al. .......... 180/242 |
| 5,137,100 A * | 8/1992 | Scott et al. ................. 180/6.48 |
| 5,335,496 A | 8/1994 | Azuma et al. |
| 5,427,217 A * | 6/1995 | Patridge .................... 192/13 R |
| 5,590,737 A * | 1/1997 | Azuma et al. .............. 180/308 |
| 5,689,955 A * | 11/1997 | Hauser et al. ................. 60/442 |
| 5,848,664 A * | 12/1998 | Kaspar ........................ 180/308 |
| 6,126,564 A * | 10/2000 | Irikura et al. ................. 475/24 |
| 6,196,348 B1 * | 3/2001 | Yano et al. .................. 180/242 |
| 6,336,513 B1 * | 1/2002 | Hasegawa et al. ........... 180/6.2 |
| 6,401,854 B2 * | 6/2002 | Yano et al. .................. 180/242 |
| 6,571,894 B2 * | 6/2003 | Ishimaru et al. ........... 180/53.4 |
| 6,578,656 B2 * | 6/2003 | Samejima et al. .......... 180/291 |
| 6,601,474 B2 * | 8/2003 | Ishimaru et al. ....... 74/665 GA |
| 6,648,094 B2 * | 11/2003 | Abend et al. ............... 180/367 |

FOREIGN PATENT DOCUMENTS

JP   2001-275440   3/2001

* cited by examiner

*Primary Examiner*—Christopher P. Ellis
*Assistant Examiner*—Jeff Restifo
(74) *Attorney, Agent, or Firm*—The Webb Law Firm

(57) ABSTRACT

A self-propelled working vehicle comprises a front wheel unit, a rear wheel unit including a left rear wheel and a right rear wheel, and a drive transmission apparatus for transmitting drive from an engine to the rear wheel unit. The drive transmission apparatus includes a first drive transmission mechanism for transmitting the drive to the left rear wheel and a second drive transmission mechanism for transmitting the drive to the right rear wheel. The first transmission mechanism is arranged at the left side of the vehicle body, while the second transmission mechanism is arranged at the right side of the vehicle body. A brake assembly is arranged between the first drive transmission mechanism and the second drive transmission mechanism for acting on an output shaft of a first transmission unit and an output shaft of a second transmission unit. The first and second transmission units act as first and second change speed devices, respectively, which are operable independently of each other.

7 Claims, 7 Drawing Sheets

SELF-PROPELLED WORKING VEHICLE

BACKGROUND OF THE INVENTION

1. Field of the Invention

The present invention relates to a self-propelled working vehicle, and particularly to a mower, including right and left drive wheels driven independently of each other.

A typical self-propelled working vehicle of this type comprises a front wheel unit, a rear wheel unit including a left rear wheel and a right rear wheel, and a drive transmission apparatus for transmitting drive from an engine to the rear wheel unit. The drive transmission apparatus includes a first drive transmission mechanism for transmitting the drive to the left rear wheel and a second drive transmission mechanism for transmitting the drive to the right rear wheel. The first transmission mechanism is arranged at the left side of a vehicle body, while the second transmission mechanism is arranged at the right side of the vehicle body.

2. Description of the Related Art

For example, Japanese Patent Unexamined Publication No. 2001-275440 discloses a mower including a drive transmission apparatus having a branch transmission case for diverging torque output from an engine to rearward positions, a pair of stepless change speed devices for transmitting the output from the branch transmission case to the rearward positions, and a pair of wheel transmission cases for transmitting the output to a left rear wheel and a right rear wheel individually. A running brake is provided outwardly and laterally of each of the right and left wheel transmission cases to be operable by a brake pedal disposed on a driving platform.

Such a mower includes the right and left brakes provided outwardly of the change speed devices and thus protruding from the vehicle body. As a result, the actual width of the vehicle body is increased, which is contrary to compactness of the vehicle body.

SUMMARY OF THE INVENTION

The object of the present invention is to provide a self-propelled working vehicle with a minimized width.

In order to achieve this object, a self-propelled working vehicle of the type noted above according to the present invention includes a brake assembly arranged between the first drive transmission mechanism and the second drive transmission mechanism for acting on an output shaft of a first transmission unit provided for the first drive transmission mechanism and on an output shaft of a second transmission unit provided for the second drive transmission mechanism.

With this construction, the brake assembly is provided within a space formed, as a natural result, between the first transmission unit and second transmission unit arranged at the opposite sides of the vehicle body, respectively. This eliminates the disadvantage of the brake assembly protruding outwardly of the right and left transmission mechanisms. Thus, a compact self-propelled working vehicle with a reduced width can be realized.

Preferably, the first and second transmission units are constructed as change speed devices, respectively, and the first and second change speed devices are operable independently of each other. Particularly, a construction with each of the first and second change speed devices being constructed as a hydrostatic stepless transmission device switchable between forward movement and backward movement is advantageous to a working vehicle that performs operations while frequently reversing its direction of movement.

In one preferred embodiment of the present invention, the brake assembly includes a first braking member movable between a braking position to engage the output shaft of the first change speed device and a releasing position to disengage the output shaft of the first change speed device, a second braking member movable between a braking position to engage the output shaft of the second change speed device and a releasing position to disengage the output shaft of the second change speed device, and a control unit for moving the first and second braking members to the braking positions at the same time. With this construction, the first and second braking members are operable by the single common control unit, which makes the brake assembly compact.

In a further preferred embodiment of the present invention, each braking member includes brake disks arranged coaxially with, and movable axially of, a corresponding one of the output shafts. The control unit for moving the brake disks axially includes pressure plates movable axially of the output shafts by a cam mechanism or a hydraulic mechanism. With this construction, a force acts on at least two pressure plates to move them axially away from each other and operate the two groups of brake disks. This simplifies the brake operating mechanism.

It is also preferable that the vehicle body has a utility space defined centrally thereof defined by the brake assembly and the first and second drive transmission mechanisms. Where this self-propelled working vehicle is a mower, such an arrangement is advantageous since a grass clipping transport duct may extend through this utility space.

Other features and advantages of the invention will be apparent from the following detailed description of the preferred embodiments to be taken with reference to the accompanying drawings.

DESCRIPTION OF THE PREFERRED EMBODIMENT

Figure 1:
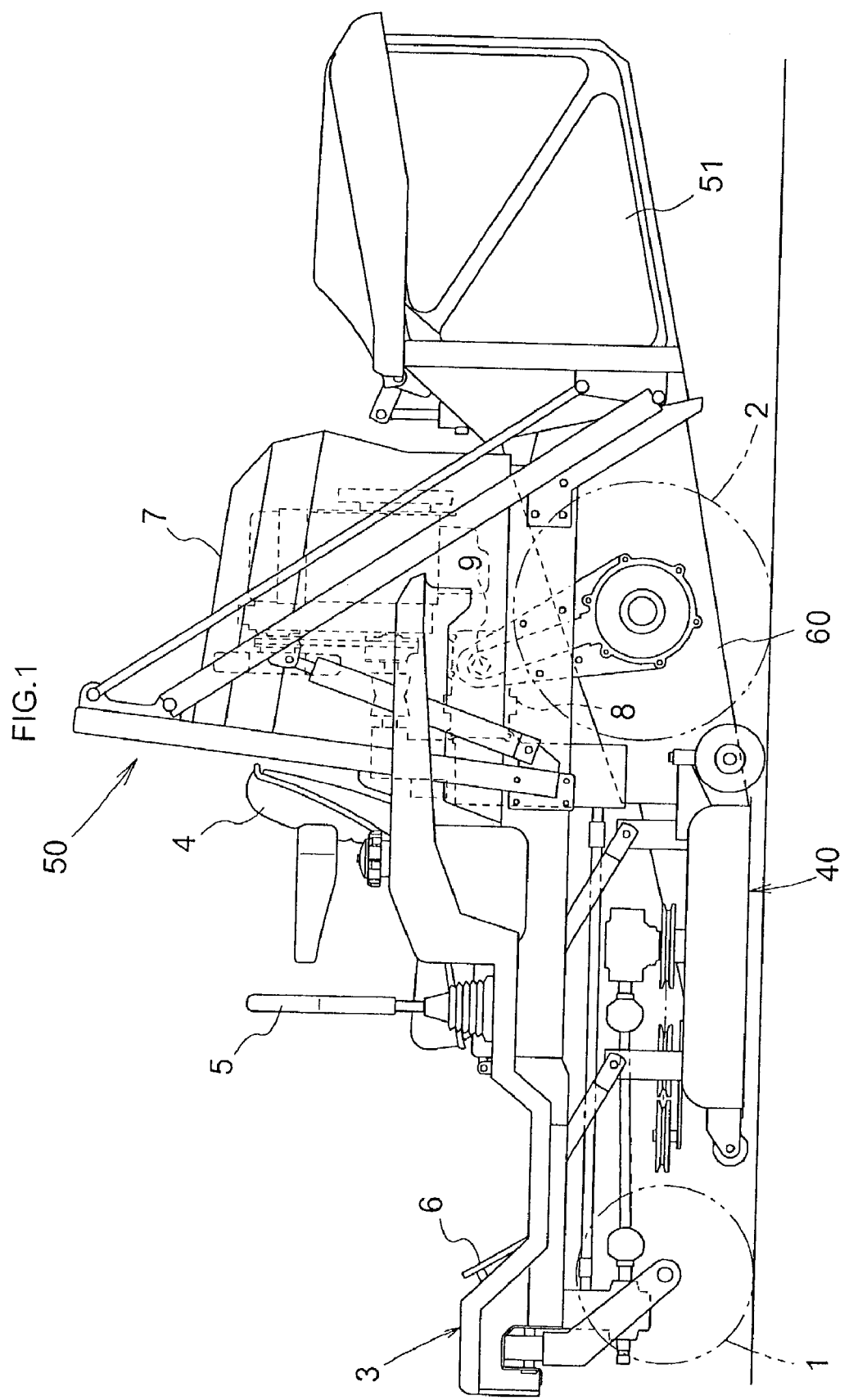
FIG. 1 is a side elevation of a mower which is one example of self-propelled working vehicle according to the present invention.
Figure 2:
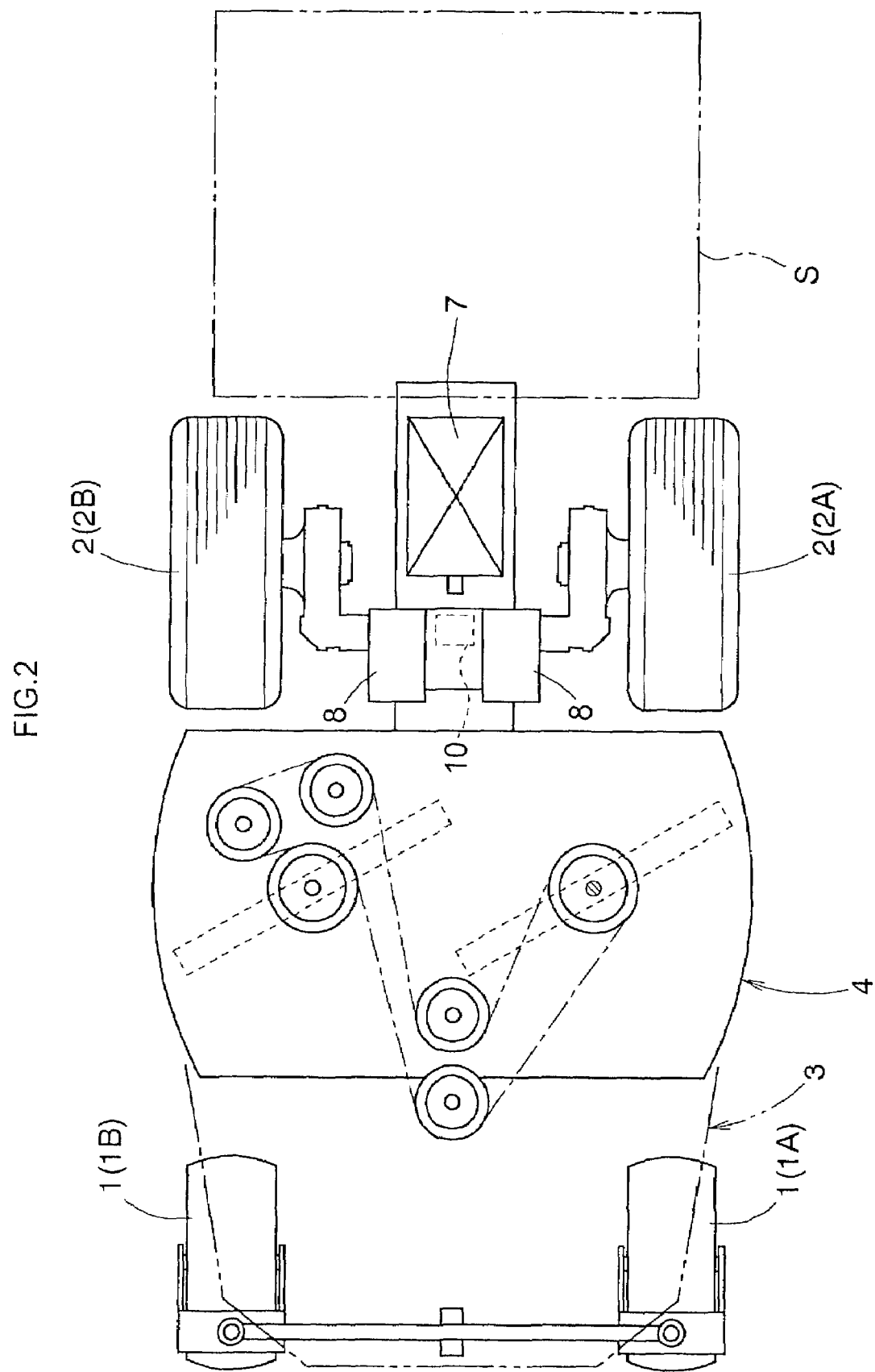
FIG. 2 is a schematic plan view of the mower shown in FIG. 1.
Figure 3:
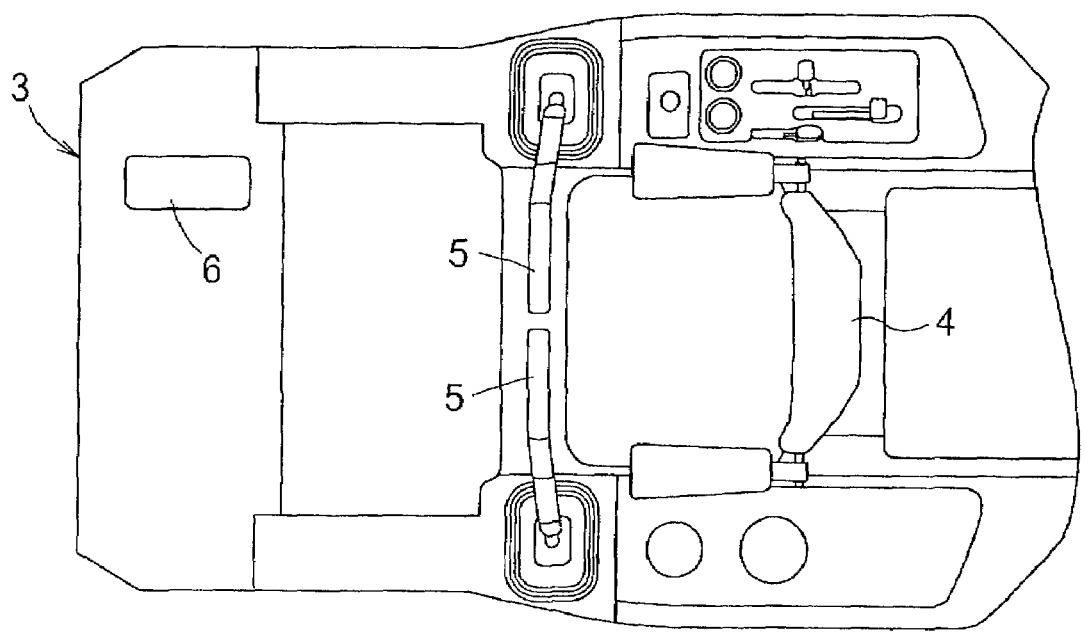
FIG. 3 is a further schematic plan view of the mower shown in FIG. 1.

FIGS. 1 through 4 show a mower exemplifying a self-propelled working vehicle according to the present invention. The mower comprises a front wheel unit 1 including right and left caster-type front wheels 1A and 1B, a rear wheel unit 2 including right and left rear drive wheels 2A and 2B, a vehicle frame 3 supported by the front wheel unit 1 and rear drive wheel unit 2 relative to the ground, and a mower unit 40 suspended from the vehicle frame 3 to be vertically movable between the front wheel unit 1 and rear drive wheel unit 2. A driver's seat 4 is mounted on the vehicle frame 3 generally directly over the mower unit 40. A duct 60 extends through a space between the right and left rear drive wheels 2A and 2B for guiding grass clippings cut by the mower unit 40 to a rear portion of the mower to be discharged rearwardly. A grass catcher 51 is connected to a rear portion of the vehicle frame 3 through a four-point link mechanism 50 to be switchable between a grass collecting position for receiving and collecting the grass clippings and an upper discharging position.

Right and left steering control levers 5 are provided forwardly of the driver's seat 4 on the vehicle frame 3. A brake pedal 6 is provided in an area around a foot of the operator seated on the driver's seat 4. An engine 7 is mounted rearwardly of the driver's seat 4.

Figure 5:
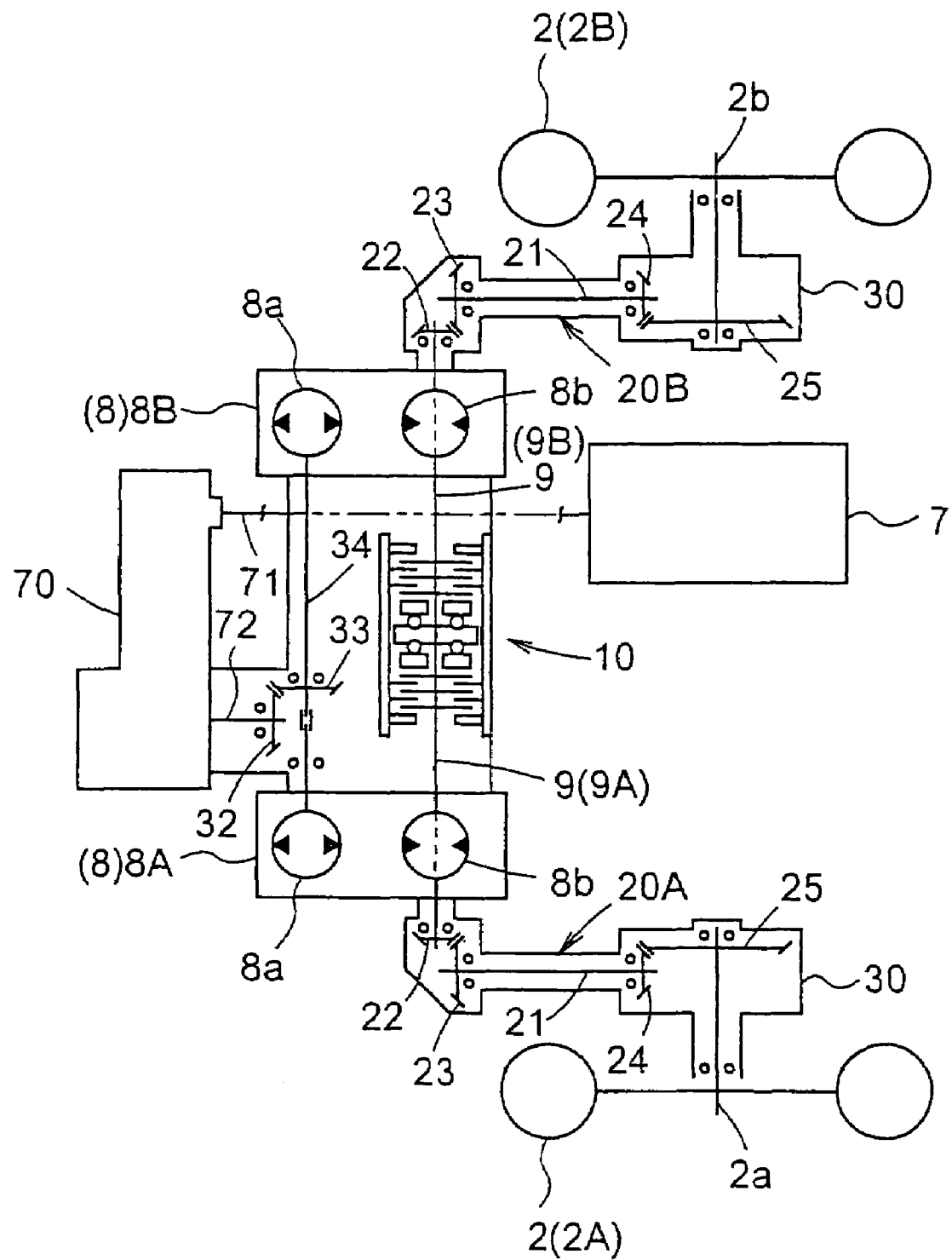
FIG. 5 is a system diagram of a power transmission line.

As shown in FIG. 5, a drive transmission apparatus 20 transmits drive from the engine 7 to the right and left rear drive wheels 2A and 2B, respectively, and includes a first drive transmission mechanism 20A for transmitting divided engine drive to the left rear drive wheel 2A and a second drive transmission mechanism 20B for transmitting divided engine drive to the right rear drive wheel 2B. The first and second drive transmission mechanisms 20A and 20B have first and second change speed devices 8A and 8B incorporated therein, respectively, which are independently operable through the steering control levers 5. In the present embodiment, each of the change speed devices 8A and 8B is arranged as a hydrostatic stepless transmission device selectable between forward movement and backward movement and having a hydraulic pump 8a driven by the engine 7 and a hydraulic motor 8b driven by pressure oil supplied from the hydraulic pump 8a.

With this construction, the mower is steerable by differentiating rotational speed between the right and left rear drive wheels 2A and 2B. More particularly, the right and left rear drive wheels 2A and 2B are rotatable at the same speed forward to propel the mower straight forward. The right and left rear drive wheels 2A and 2B are rotatable at the same speed backward to propel the mower straight backward. One of the right and left rear drive wheels 2A or 2B is rotatable at a lower speed forward than the other of the right and left rear drive wheels 2B or 2A for causing the mower to make a gentle forward turn with either of the rear drive wheels 2A or 2B positioned inwardly. One of the right and left rear drive wheels 2A or 2B is rotatable at a lower speed backward than the other of the right and left rear drive wheels 2B or 2A for causing the mower to make a gentle backward turn with either of the rear drive wheels 2A or 2B positioned inwardly. One of the right and left rear drive wheels 2A or 2B is rotatable forward with the other of the right and left rear drive wheels 2B or 2A stopped for causing the mower to make a forward pivot turn about either of the rear drive wheels 2A or 2B. One of the right and left rear drive wheels 2A or 2B is rotatable backward with the other of the right and left rear drive wheels 2B or 2A stopped for causing the mower to make a backward pivot turn about either of the rear drive wheels 2A or 2B. The right and left rear drive wheels 2A and 2B are rotatable in opposite directions for causing the mower to make a spin turn.

Figure 4:
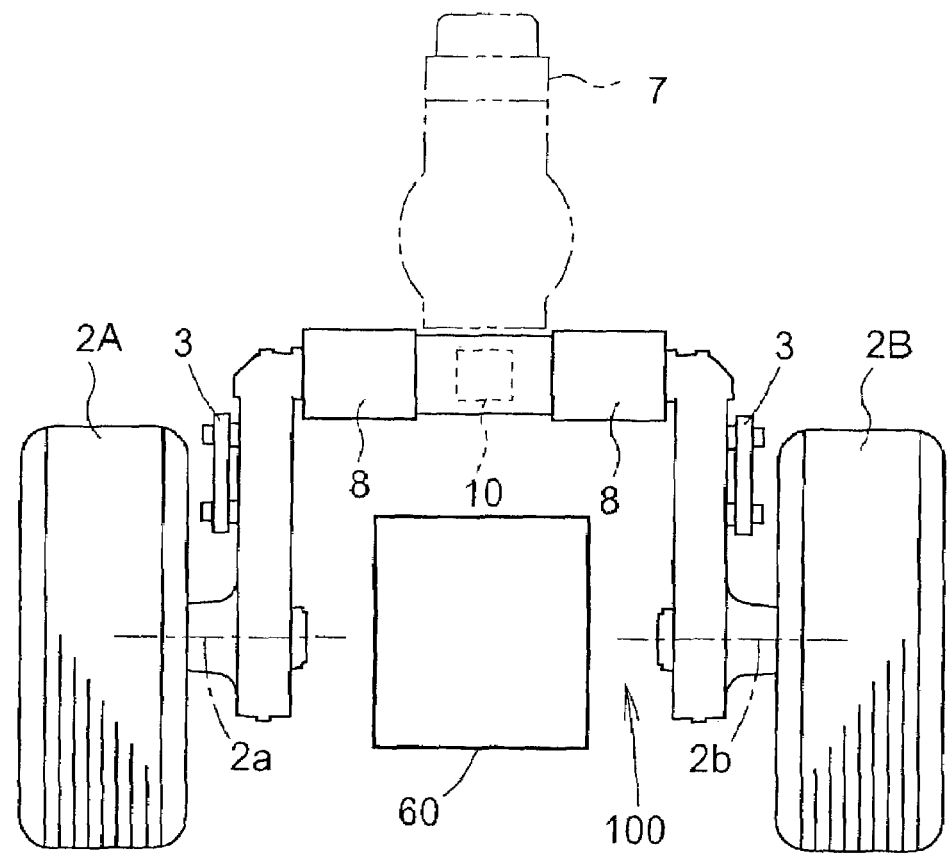
FIG. 4 is a schematic front view of the mower shown in FIG. 1.

As understood from FIG. 4, the first and second change speed devices 8A and 8B are juxtaposed transversely between the rear drive wheels 2A and 2B. The engine 7 is provided at a higher level than the change speed devices between the rear drive wheels 2A and 2B. With respect to height, the first and second change speed devices 8A and 8B are provided between the engine 7 and the rear wheel unit 2 in the present embodiment. Each of the rear drive wheels 2A and 2B is supported by a rear axle extending horizontally and outwardly from a lower end of a vertically extending rear axle case 30 attached inwardly of the vehicle frame 3. The rear axle cases 30 extending upward inwardly of the rear drive wheels 2A and 2B define a utility space 100 inwardly thereof. The duct 60 extends longitudinally of the vehicle through this space 100 in the present embodiment.

The drive transmission apparatus 20 will be described next with reference to FIG. 5.

Drive is transmitted from the engine 7 to an input shaft 71 of an intermediate transmission mechanism 70 and exits from an output shaft 72 of the intermediate transmission mechanism 70. The output shaft 72 extending in the longitudinal direction of the vehicle is connected to a cross transmission shaft 34 through bevel gears 32 and 33. The cross transmission shaft 34 is connected at one end thereof to an input shaft of the pump 8a of the first change speed device 8A and at the other end thereof to an input shaft of the pump 8a of the second change speed device 8B. An output shaft 9A extending transversely of the motor 8b of the first change speed device 8A protrudes from opposite sides of the first change speed device 8A. Similarly, an output shaft 9B extending transversely of the motor 8b of the second change speed device 8B protrudes from opposite sides of the second change speed device 8B. The output shaft 9A of the first change speed device 8A is coaxial with the output shaft 9B of the second change speed device 8B.

Each of free ends of the output shafts 9A and 9B is connected to an upper end of a vertical transmission shaft 21 housed in the rear axle case 30 through bevel gears 22 and 23. Each transmission shaft 21 is connected at a lower end thereof to an axle 2a or 2b of the rear drive wheel 2A or 2B through bevel gears 24 and 25.

Figure 6:
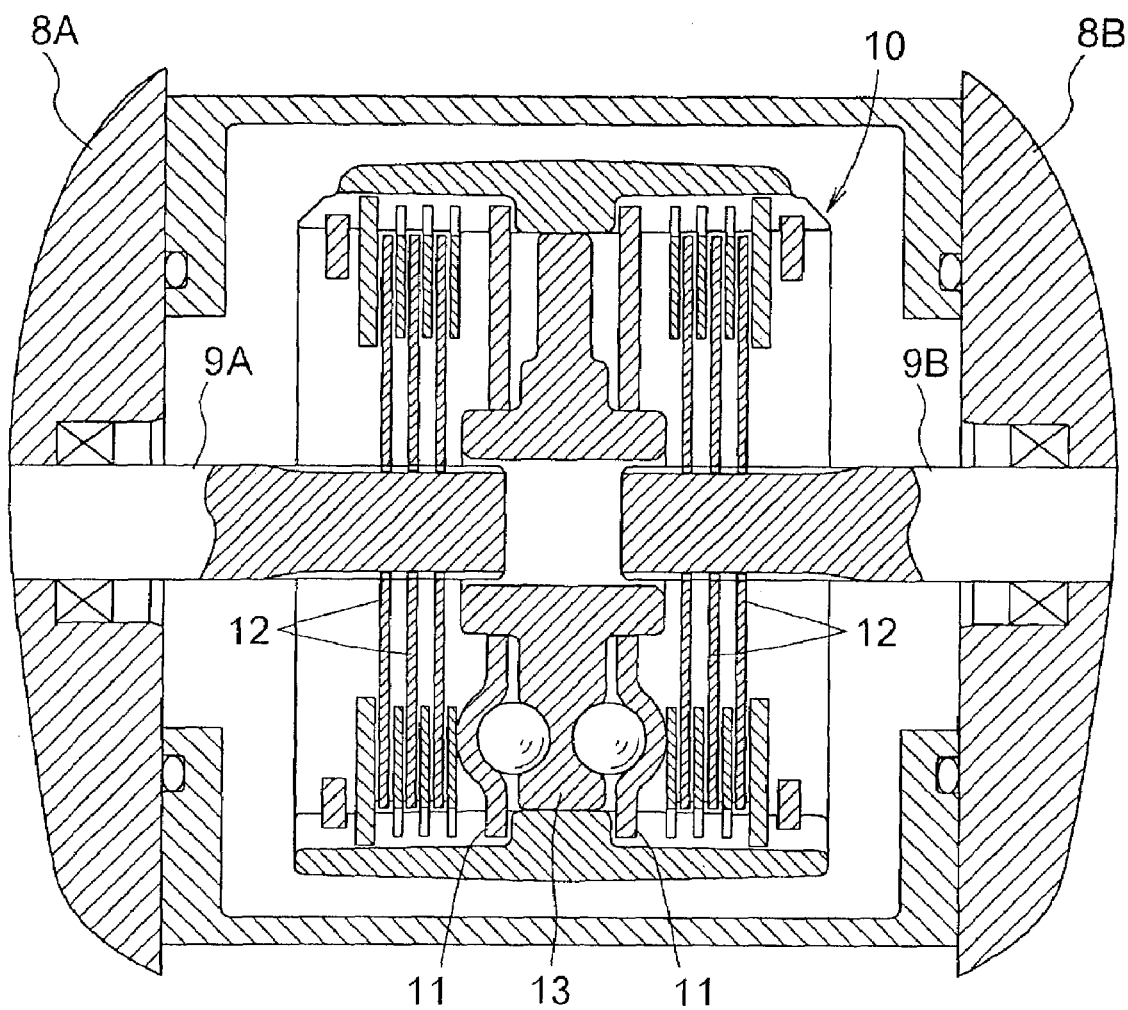
FIG. 6 is a view in vertical section of a brake mechanism.

As illustrated in FIG. 6, a brake assembly 10 is provided between the first and second change speed devices 8A and 8B to be operable by the brake pedal 6 for braking the output shafts 9A and 9B of the change speed devices 8A and 8B.

The brake assembly 10 includes two multi-disk braking units as braking members. Each of the braking units includes a pressure plate 11 operable in an axial direction to press a plurality of brake disks into contact for braking action. As a control unit of the braking members, a cam mechanism 13 is provided for bridging the output shafts 9A and 9B, to be rotatable about the axis to operate the pressure plates 11 in the axial directions. The cam mechanism 13 is a well-known type, and will not particularly described herein. To be brief, a cam plate is rotated to move balls engaged in an inclined groove of the cam plate in the axial directions thereby to press the pressure plates 11.

Figure 7:
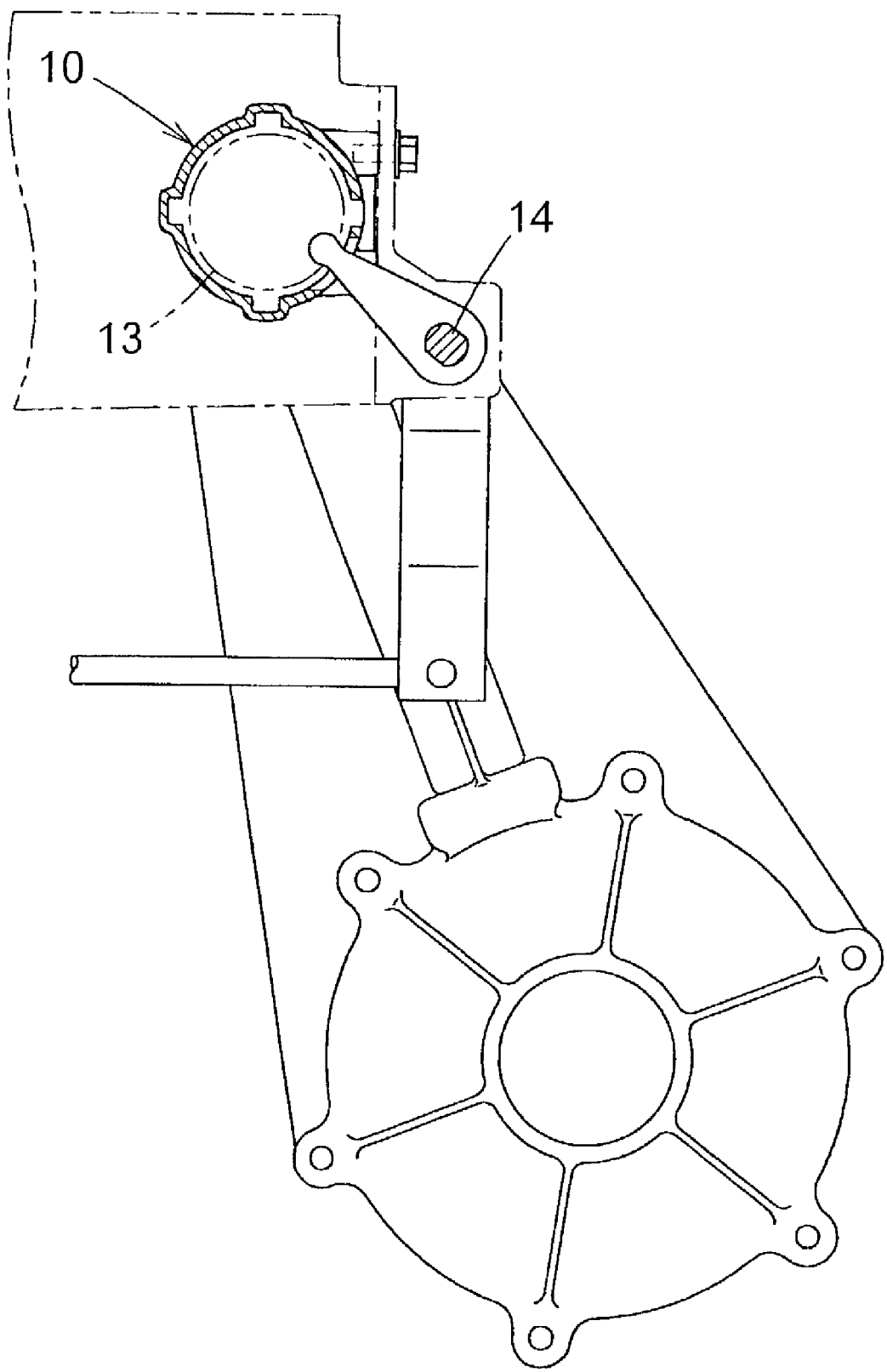
FIG. 7 is a side view in vertical section of a first drive transmission mechanism.

Every second disk of the brake disks 12 is fixed, and the disks 12 placed between the fixed disks are rotatable with the output shafts 9. FIG. 7 shows a brake control shaft 14 rotatable by depression of the brake pedal 6 to rotate the cam mechanism 13.

ALTERNATIVE EMBODIMENT

Figure 8:
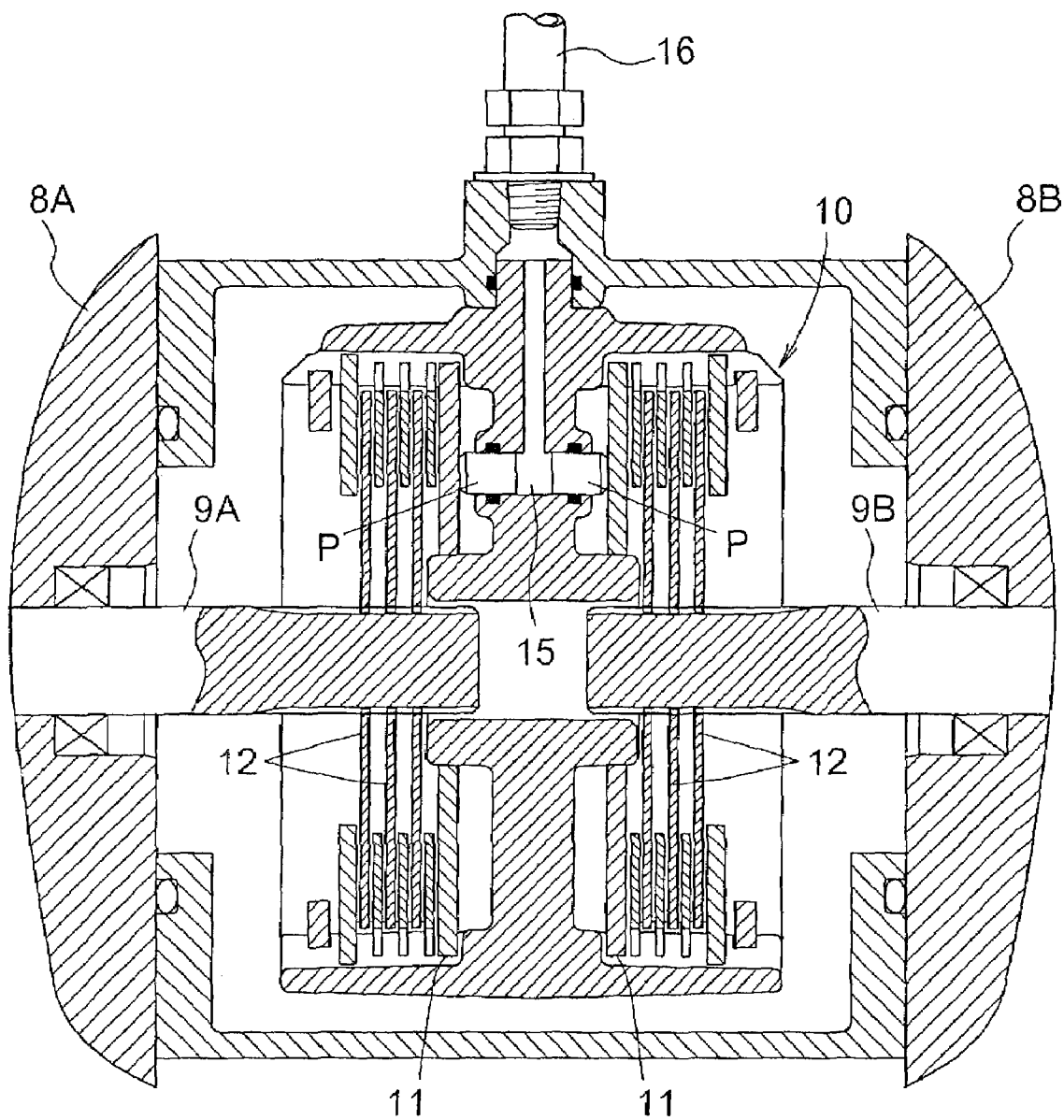
FIG. 8 is a view in vertical sectional of a brake mechanism according to another embodiment of the present invention.

The foregoing embodiment employs the cam mechanism 13 as the control unit. Instead, as illustrated in FIG. 8, a hydraulic mechanism may be employed as the control unit in which a pressure oil supplying space 15 is defined between the pressure plates 11 of the brake assembly 10. Pressure oil is supplied to the pressure oil supplying space 15 through an oil passage 16 in response to a depression of the brake pedal 6 to actuate piston Ps, thereby to move both of the pressure plates 11 in the axial directions.

What is claimed is:

1. A self-propelled working vehicle comprising:
an engine;
a front wheel unit;
a rear wheel unit including a left rear wheel and a right rear wheel;
a vehicle body supported by the front wheel unit and rear wheel unit relative to the ground;
a drive transmission apparatus for transmitting drive from the engine to the rear wheel unit, wherein the drive transmission apparatus includes a first drive transmission mechanism for transmitting the drive to the left rear wheel and a second drive transmission mechanism for transmitting the drive to the right rear wheel, the first transmission mechanism being arranged at a left side of the vehicle body, the second transmission mechanism being arranged at a right side of the vehicle body;
a first transmission unit provided for the first drive transmission mechanism;
a second transmission unit provided for the second drive transmission mechanism, the second unit being speed controllable independently from the first transmission unit; and
a brake assembly for acting on an output shaft of the first transmission unit and an output shaft of the second transmission unit, the brake assembly being arranged between the first drive transmission mechanism and the second drive transmission mechanism, the brake assembly including a first braking member movable between a braking position for applying a braking force to the output shaft of the first transmission unit and a releasing position for releasing the braking force to the output shaft of the first transmission unit, a second braking member movable between a braking position for applying a braking force to the output shaft of the second transmission unit and a releasing position for releasing the braking force to the output shaft of the second transmission unit, and a control unit for moving the first and second braking members to the braking positions at the same time.

2. A working vehicle as claimed in claim 1, wherein each of the braking members includes brake disks arranged coaxially with, and movable axially of, a corresponding one of the output shafts.

3. A working vehicle as claimed in claim 2, wherein the control unit includes pressure plates movable axially of the output shafts by a cam mechanism.

4. A working vehicle as claimed in claim 2, wherein the control unit includes pressure plates movable axially of the output shafts by a hydraulic mechanism.

5. A working vehicle as claimed in claim 1, wherein the first and second transmission units are constructed as first and second change speed devices, respectively, which are operable independently of each other.

6. A working vehicle as claimed in claim 5, wherein each of the first and second change speed devices is a hydrostatic stepless transmission device switchable between forward movement and backward movement.

7. A working vehicle as claimed in claim 1, wherein the vehicle body has a utility space defined centrally thereof defined by the brake assembly and the first and second drive transmission mechanisms.

* * * * *